Nov. 18, 1941.  F. R. COUMBE ET AL  2,263,207
INTERMITTENT CONVEYER
Filed Oct. 29, 1938  3 Sheets-Sheet 1
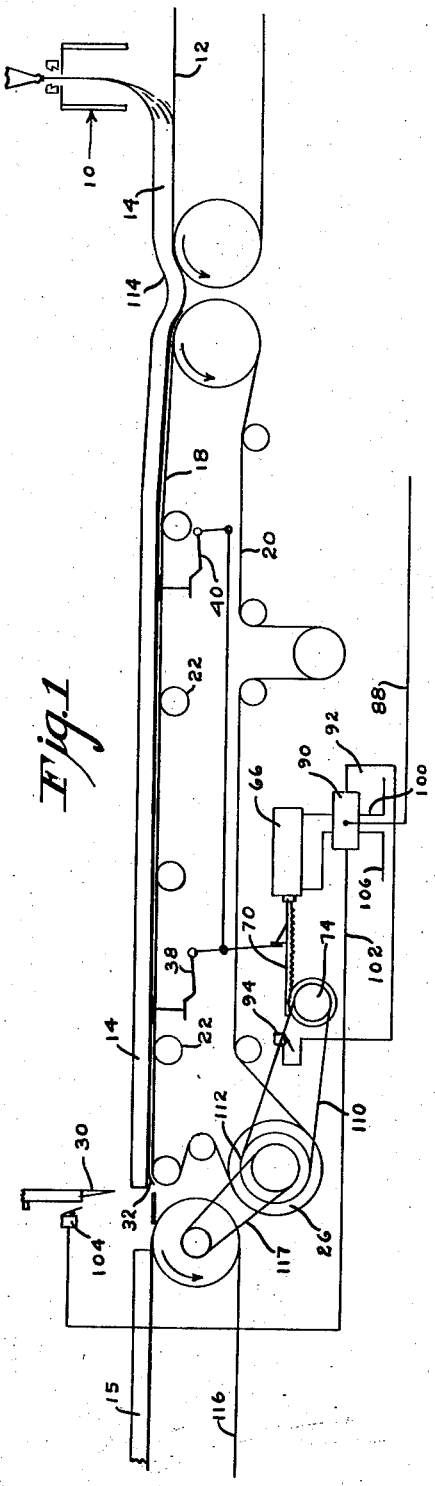
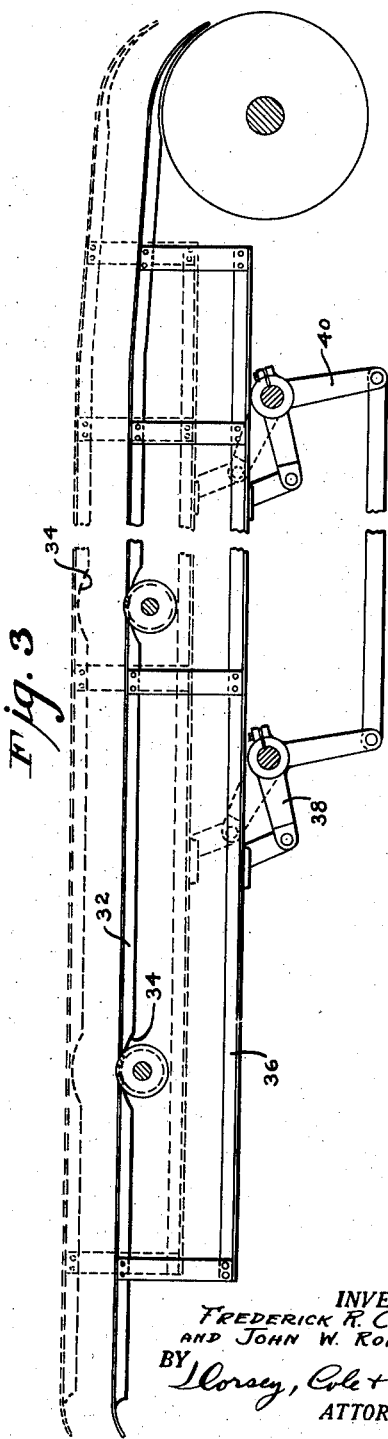
INVENTORS.
FREDERICK R. COUMBE
AND JOHN W. ROMIG
BY Dorsey, Cole + Garner
ATTORNEYS.

Nov. 18, 1941.  F. R. COUMBE ET AL  2,263,207
INTERMITTENT CONVEYER
Filed Oct. 29, 1938  3 Sheets-Sheet 2
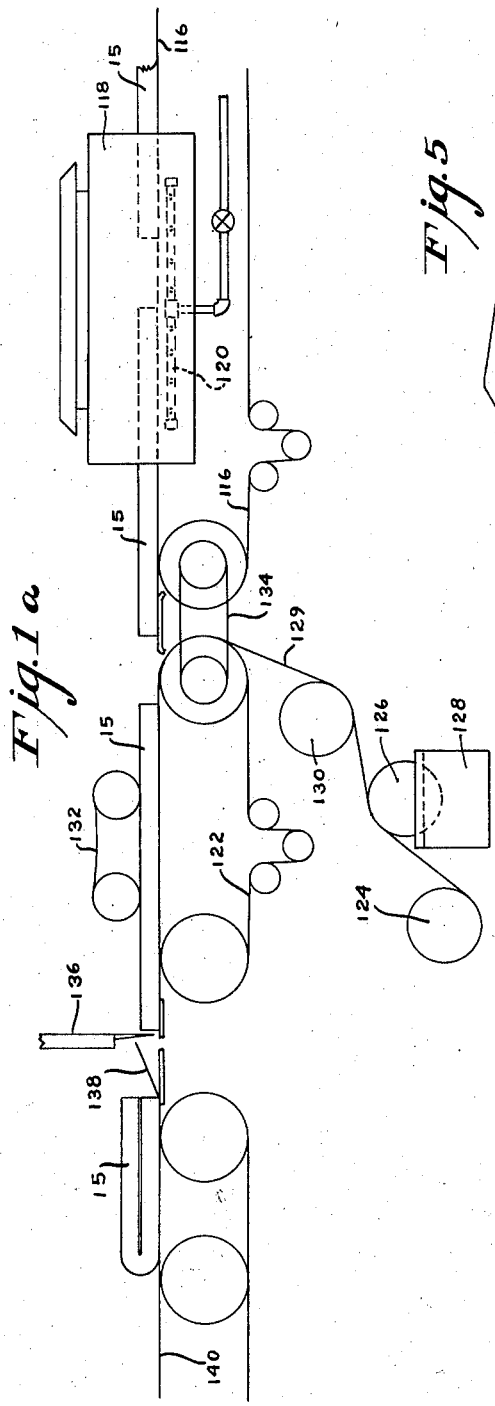
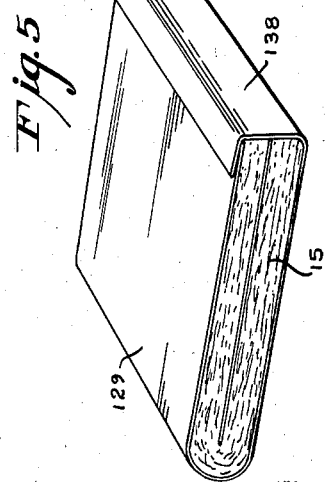
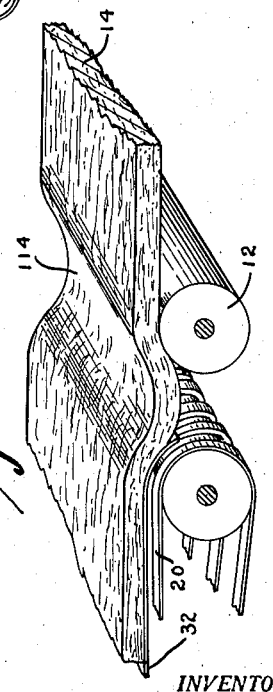
INVENTORS.
FREDERICK R. COUMBE
AND JOHN W. ROMIG
BY Dorsey, Cole + Garner
ATTORNEYS.

Patented Nov. 18, 1941

2,263,207

UNITED STATES PATENT OFFICE 2,263,207

INTERMITTENT CONVEYER

Frederick R. Coumbe and John W. Romig, Corning, N. Y., assignors, by mesne assignments, to Owens-Corning Fiberglas Corporation, Toledo, Ohio, a corporation of Delaware Application October 29, 1938, Serial No. 237,711

6 Claims. (Cl. 164—48)

This invention relates to the handling of fibrous materials and more particularly to mechanism adapted to form such materials into insulating bats of desired configuration and methods of operating such mechanism.

Fibrous insulating materials of various types are now commonly used in the thermal insulation of buildings and various other structures whose temperature it is desired to control. Much of this insulation is applied in the form of felted bats either with or without external covering sheets. In general, these bats are formed by allowing a continuous supply of the basic fibres to settle through the atmosphere onto a continuously moving belt forming a felted mass of fibres thereon. The fibres may be of organic or mineral composition and either produced artificially or obtained from natural sources. Binders may be sprayed onto the fibres as they collect to lend additional strength to the felted mass and the degree of felting obtained may be influenced by drawing the fibre laden atmosphere through the foraminous conveyer by suitably located suction means. The sheet of felted material thus formed is subsequently divided into sections of desired size which are generally known as bats.

In certain handling operations connected with the manufacture of insulating bats, it has been found desirable to separate the bats by a considerable space, one from another, as they are delivered from the forming mechanism. In the case of very short bats of a length of a foot or thereabouts, this may easily be accomplished by merely providing a take-off conveyer driven at a higher speed than the conveyer on which they are formed. This arrangement is limited in its usefulness for with longer bats several feet in length a stretching of the material occurs between the two conveyers which results in a reduction of the product from the thickness as manufactured and in extreme cases even results in tearing apart sections of the bat.

The object of the present invention is a means and method by which a continuously produced mass of fibrous material of low strength may be automatically divided into sections of appreciable length and a space of desired extent established between adjacent sections of the material after their formation without subjecting these sections to undesirable stresses incident to their production.

A further object of the invention is a method of forming a partially wrapped bat of fibrous insulation folded upon itself and held in position by a continuous envelope of sheet material adhesively attached to the fibres and joined at its ends.

These and other objects are attained by the present invention which features means for continuously forming and advancing a felted mass of fibrous material, means for periodically severing sections from said mass, means operating in timed relation with the severing means for periodically arresting the movement of the fibrous mass adjacent the severing means and means for removing the severed sections.

Further features of the invention include means for bringing the separated bats of fibres into contact with a continuous sheet of adhesively coated sheet material moving at the same speed as the bats and means for severing the coated sheet material between the spaced bats after they have been attached thereto.

The invention further features the formation of a packaged mass of insulating fibres by joining a bat of felted fibrous insulation to a covering sheet of paper or similar material somewhat longer than the bat, folding the bat upon itself so that the fibrous material is within the covering sheet and using the extra length of the covering sheet as a flap to adhesively join the ends of the folded bat together.

These and other features will be more readily apparent from consideration of the embodiment of the invention disclosed in detail in the accompanying drawings in which:

Fig. 1 is a diagrammatic elevation of the complete fibre forming and handling mechanism incorporating the present invention. This figure is shown in two parts as Fig. 1 and Fig. 1a;

Fig. 3 is a detail elevation showing the fibre lifting rack and a part of the operating mechanism in both raised and lowered positions;

Fig. 4 is a perspective detail showing the fibrous mass sagging between conveyer sections when the lifting rack is raised; and Fig. 5 is a perspective of a folded bat of insulation encased in sheet material in accordance with the invention.

Figure 2:
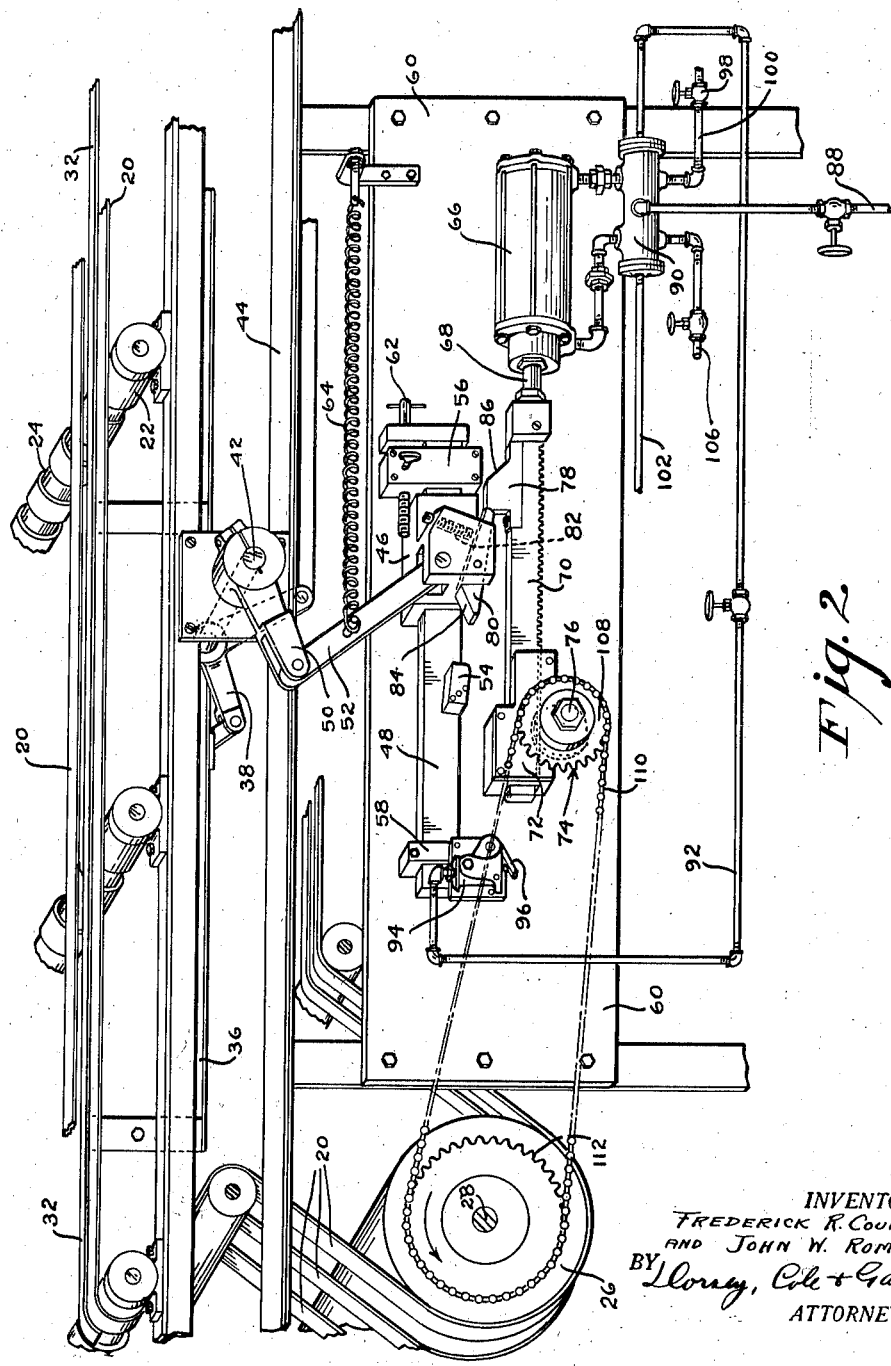
Fig. 2 is a perspective detail showing the mechanism for interrupting forward movement of the felted fibrous mass.

Referring in more detail to the structure shown in the drawings, Fig. 1 indicates diagrammatically means for continuously forming and advancing a felted blanket of fibrous material and means for intermittently severing and arresting portions of this blanket. Any type of fibres may be employed which will felt together to form a porous mass of low thermal conductivity and sufficient strength to permit handling, such as wood and asbestos fibres, hair, mineral wool and the like, but in the drawings 10 indicates generally a mechanism for producing glass wool of the type disclosed in the British patent to Triggs No. 428,720. Fibres so produced are collected on the conveyer 12 in a continuous felted mass 14 whose thickness is determined by the rate of production of the fibres, the speed of the conveyer belt and the manner in which they are compacted on the belt. In operation, conveyer 12 is driven continuously at a predetermined speed by conventional means which are not shown.

Preferably, conveyer 12 extends but a short distance beyond the zone in which the fibrous mat 14 is formed, at which point the mat passes to a second conveyer 18 which is driven at a slightly higher rate of speed than conveyer 12. Conveyer 18 is formed of a number of narrow continuous belts 20 which are supported in spaced relation by freely rotatable rollers 22. These rollers 22 are provided with circumferential grooves 24 located between the belt supporting sections of the roller as shown more clearly in Fig. 2. Belts 20 are driven from a drum 26 which is mounted on a driven shaft 28 connected to a suitable source of power, not shown. A flying shear type of cutter blade represented diagrammatically at 30 is operatively mounted at the discharge end of the conveyer 18 and is periodically actuated by a regulable timing mechanism of standard make, not shown.

Coextensive with the length of conveyer 18 and occupying the space between the belts 20 is a lifting rack formed of a number of rods 32 of angle iron or similar material. These rods are cut away at 34 so as to fit freely into the grooves 24 in rollers 22 and lie flush with or slightly below the surface of the belts 20. These rods are interconnected with and supported by a frame 36 and are raised into operative position by bell crank levers 38 and 40. As shown in detail in Fig. 2, bell crank 38 is keyed to a shaft 42 which is mounted for rotation in the frame 44 of the conveyer. A slide block 46 mounted for horizontal movement along a support bar 48 is connected to an arm 50 keyed to the end of shaft 42 by means of link 52. A stop block 54 rigidly mounted on bar 48 limits movement of the slide block 46 to the left while in its extreme right position, it abuts the bracket 56 which with bracket 58 serves to attach slide bar 48 to the support plate 60. Bar 48 is slidably mounted in brackets 56 and 58 and its position with respect thereto may be adjustably determined by screw 62 attached to one end of the bar and threaded into the adjacent bracket. Block 46 is normally urged to the extreme right end of its travel by the weight of the frame 36 and bars 32 and the additional force of a spring 64.

Movement of slide block 46 toward the left to actuate the lifting mechanism and raise the fibrous material from contact with conveyer 18 may be accomplished by means of a fluid motor 66 to whose piston rod 68 is attached a rack member 70. This rack is slidably supported at its free end in a bracket 72 and meshes with a gear forming part of an overrunning clutch mechanism 74 mounted for rotation about a stud shaft 76. The purpose of this mechanism will subsequently be more fully described. Power from the fluid motor 66 is transmitted to the slide block 46 through a thrust block 78 mounted on rack 70 which engages the end of a pivoted dog 80 carried in block 46 and normally held in alignment with block 78 by a spring 82. As the slide block moves to the left, an inclined end 84 of the dog 80 engages the stop 54 whereupon further movement of the block 46 results in the release of the dog from engagement with thrust block 78. On release of the dog, the slide block assembly is moved to the right again under the influence of the spring 64 and the weight of the rack 32. When the rack 70 and thrust block 46 are retracted by operation of the piston 68, dog 80 is raised by an inclined surface 86 on thrust block 78 compressing spring 82 which resets the dog as the block 46 reaches its extreme right position of travel.

Motor 66 is operated by fluid under pressure from a suitable source 88 by means of a control valve 90. This valve is of the conventional floating piston type and is actuated by reducing the pressure on one end or the other by the actuation of pilot valves opening to the atmosphere. As shown in Fig. 2, the right-hand end of control valve 90 is connected by pipe 92 to a pilot valve 94 mounted on plate 60 in alignment with rack 70. As the rack reaches its extreme left-hand position of travel, it engages a pivoted valve actuating lever 96 which opens valve 94 to atmosphere thus reducing the pressure on the right-hand end of valve 90 and causing its floating piston to move to the right under the influence of the pressure communicated to its left-hand end from line 88 through a port in the piston. This movement of the piston causes alignment of suitable ports so that line pressure is applied to the left-hand end of motor 66 and connects the right-hand end to atmosphere thus causing movement of piston 68 to the right. A valve 98 in the exhaust pipe 100 permits throttling of the escaping fluid and control of the rate of travel of the piston, if and as desired. The left-hand end of control valve 90 is similarly provided with a bleed line 102 connected to a relief valve 104 mounted for engagement by the shear mechanism 30 and a valved exhaust line 106 to atmosphere.

In operation, fibres are continuously produced at 10 and the speed of the conveyer 12 so regulated as to give a felted body of fibres 14 of the desired thickness. The speed of conveyer 18 is then regulated so as to be enough faster than conveyer 12 to give the desired spacing between the separated bats. This speed is determined by the length of the bat being produced and the space desired. For example, if bats ten feet long are being produced and a space of ten inches is desired between bats, conveyer 18 is so regulated as to travel ten feet and ten inches, while the conveyer 12 travels ten feet. Whatever this speed, all subsequent sections of the conveyer are preferably moved thereat with the possible exception of the final take-off section. Actuation of the shear mechanism 30 is timed with respect to the speed of the conveyer 18 so as to cut the felted mass of fibres 14 into bats 15 of the desired length.

As the shear mechanism 30 acts to sever a bat 15 from the felted mass of fibres 14, it opens the valve 104 relieving pressure on the left-hand end of valve 90 and causing its piston to move to the left. In this position, the left-hand end of motor 66 is connected to atmosphere through line 106 and line pressure is applied to the right-hand end forcing piston 68 and rack 70 to the left. A sprocket 108 is attached to one part of the overrunning clutch mechanism 74 and is continuously driven through chain 110 from a sprocket 112 fixed on the end of the drum 26.

Initial movement of rack 70 to the left turns the gear with which it meshes which in turn actuates the clutch mechanism positively connecting said gear to sprocket 108 so long as the rack 70 is urged to the left by piston 68. Since rotation of sprocket 108 is controlled by the mechanism which drives conveyer 18, the clutch 74 restricts the rate of advance of the rack 70 to a constant predetermined speed in relation to the speed of the conveyer 18. The initial movement of slide block 46 to the left raises rack 32 sufficiently to lift the felted mass of fibres 14 from contact with the conveyer 18 and arrest its forward movement. The subsequent travel of block at a constant speed controlled by sprocket 108 determines the period of time the fibres are out of contact with the conveyer and thus the extent of travel of the severed bat before the advance of fibres 14 is continued, i. e., the space between adjacent severed bats.

While accurate control of the space between bats is best obtained by use of the mechanism described above, a fairly accurate control may be exercised independent of the driving mechanism of the conveyer by regulation of the valves in the exhaust lines 100 and 106 leading from control cylinder 90. If these valves are properly throttled, they permit only a slow escape of air from behind the piston 68 and so retard its travel for a sufficient period of time to give the desired separation of the bats.

During the period that the rack 32 is lifted and the felted fibres are out of contact with conveyer 18, the fibres being deposited on conveyer 12 are continuously advanced and accumulate as a loop of matted material in the space between conveyers 12 and 18. The showing of Fig. 1 is of the mechanism at the moment when the racks have restored the felted material 14 into contact with the conveyer 18, the loop of accumulated material appearing at 114. Fig. 4 is a perspective showing the accumulated material looped between the ends of the conveyers just before the rack 32 descends. The speeds of conveyers 12 and 18 are so proportioned that during the period that the material advances between operations of the shear mechanism 30 and the rack 32, the loop of accumulated material is eliminated and advanced onto conveyer 18. Thus, the loop of material 114 accumulated while the mass 14 is supported on rack 32 never exceeds the length of the space between adjacent bats and never becomes unwieldy.

As the severed bats leave the shear mechanism 30, they are carried by conveyer 116 through a drying chamber 118 heated by suitable means such as gas burners 120. Conveyers 116 is driven at the same speed as conveyer 18, as for example, by chain 117 driven from shaft 28. By such a treatment, the fibres may be relieved of any excess moisture previously introduced in the forming operations and if a binder has been applied to the fibres, such treatment may be so regulated as to dry or harden the binder to the desired degree. Conveyer 116 preefrably terminates shortly beyond the oven 118 to permit the introduction of an adhesively coated sheet of backing material between the bats and the next conveyer 122. As shown, a roll of paper or cloth 124 is rotatably positioned beneath the conveyer 122 and the web therefrom is passed in contact with a coating roll 126 dipping into a bath of adhesive material 128. The coated web 129 then passes around guide roll 130 and onto conveyer 122 where its coated surface contacts the bat. Adhesion of the bats to the web is insured by a pressure belt 132 positioned above and in contact with the bats. Conveyer 122 may be driven by any suitable means at the same speed as conveyer 116, but as shown is driven from conveyer 116 by a chain 134. As the web and adhering bats leave conveyer 122, they pass below a second shear mechanism 136 which is so timed in its operation as to cut the web between the bats and preferably at a point slightly in advance of the leading edge of the bat.

The adhesive applied by roll 126 is preferably a thermoplastic material such as asphalt or the like. In any event, it is desirable that the adhesive remain soft and sticky until after the material passes the shear 136. This is of particular advantage in the formation of a product such as shown in Fig. 5 since it permits folding the bat upon itself and sealing the exposed end merely by turning up the intermediate flap 138 of the coated web. This operation is preferably performed as the bat is removed by take-off conveyer 140. Such a coating sheet holds the fibrous material to a desired form and size and materially aids in the handling and installation of the product in the wall spaces of houses, refrigerators, and the like.

While the invention has been described in detail with respect to a particular modification, it must be realized that this description is by way of illustration and not of limitation and modification and substitution is to be expected within the scope of the present invention.

We claim:

1. The method of forming a spaced series of bats of fibrous material which comprises continuously forming and advancing a body of fibrous material, periodically severing a portion of said body to form a bat, removing said bat at a constant speed, interrupting the advance of the adjacent portion of the body from which it was severed for a predetermined time interval, accumulating the continuously formed body during this time interval, and resuming the advance of the portion of the body from which the bat was severed at the speed of removal of the bat, said speed being such as to take up the accumulated portion of the body by the time the next bat is severed.

2. The method of forming a spaced series of bats of fibrous material which comprises continuously forming and advancing a body of fibrous material, periodically severing a portion of said body to form a bat, removing said bat at a constant speed, interrupting the advance of the adjacent portion of the body from which it was severed for a predetermined time interval, accumulating the continuously formed body during this time interval, and resuming the advance of the portion of the body from which the bat was severed at the speed of removal of the bat, said speed being greater than rate of formation and advance of the body.

3. The combination of means for continuously forming a felted mass of fibrous material including a continuously moving conveyer for advancing said material, a second conveyer adapted to receive and advance the material advanced by said first conveyer, intermittently operable means for cutting the material advanced by said second conveyer into separate pieces, and means operating in timed relation with said cutting means for intermittently arresting the advance of the material on said second conveyer, said arresting means including means for lifting said material from contact with said second conveyer and restoring it to contact therewith.

4. The combination of means for continuously forming a felted mass of fibrous material including a continuously moving conveyer for advancing said material, a second continuously moving conveyer adapted to receive and advance the material advanced by said first conveyer, intermittently operable means for cutting the material advanced by said second conveyer into separate pieces, and means operating in timed relation with said cutting means for intermittently arresting the advance of the material on said second conveyer for a predetermined period of time.

5. The combination of means for continuously forming a felted mass of fibrous material including a continuously moving conveyer for advancing said material, a second continuously moving conveyer adapted to receive and advance the material advanced by said first conveyer, intermittently operable means for cutting the material advanced by said second conveyer into separate pieces, and means operating in timed relation with said cutting means for intermittently arresting the advance of the material on said second conveyer for a predetermined period of time and a continuously moving take-off conveyer associated with said mechanism and driven at the same surface speed as said second conveyer.

6. In a device for forming bats of fibrous material, means for continuously forming a felted mass of fibrous material including a continuous conveyer for removing the formed material, a sectional conveyer system adjacent said first conveyer and in alignment therewith, said conveyer system having a higher lineal rate of travel than said first conveyer, means associated with said conveyer system for dividing the felted mass of fibres into bats and means for causing the conveyer section adjacent said first conveyer to intermittently advance the material received from said first conveyer.

FREDERICK R. COUMBE.
JOHN W. ROMIG.